United States Patent
Branstad et al.

(10) Patent No.: US 12,242,740 B2
(45) Date of Patent: Mar. 4, 2025

(54) DATA STORAGE DEVICE AND METHOD FOR HIDING TWEAK GENERATION LATENCY

(71) Applicant: Western Digital Technologies, Inc., San Jose, CA (US)

(72) Inventors: Mark Branstad, Rochester, MN (US); Martin Lueker-Boden, Fremont, CA (US); Lunkai Zhang, Portland, OR (US)

(73) Assignee: Sandisk Technologies, Inc., Milpitas, CA (US)

( * ) Notice: Subject to any disclaimer, the term of this patent is extended or adjusted under 35 U.S.C. 154(b) by 7 days.

(21) Appl. No.: 18/223,662

(22) Filed: Jul. 19, 2023

(65) Prior Publication Data
US 2024/0361925 A1    Oct. 31, 2024

Related U.S. Application Data
(60) Provisional application No. 63/461,953, filed on Apr. 26, 2023.

(51) Int. Cl.
*G06F 3/06* (2006.01)
(52) U.S. Cl.
CPC .......... *G06F 3/0623* (2013.01); *G06F 3/0659* (2013.01); *G06F 3/0679* (2013.01)
(58) Field of Classification Search
CPC ........ G06F 3/06; G06F 3/0659; G06F 3/0623; G06F 3/0679
See application file for complete search history.

(56) References Cited

U.S. PATENT DOCUMENTS

| | | | |
|---|---|---|---|
| 9,002,002 B1 | 4/2015 | Poo et al. | |
| 11,263,153 B1* | 3/2022 | Cheng | G06F 12/0246 |
| 11,301,153 B2 | 4/2022 | Segev et al. | |
| 2017/0054550 A1* | 2/2017 | Choi | H04L 9/0637 |
| 2019/0102577 A1* | 4/2019 | Gueron | G06F 21/79 |
| 2019/0205244 A1* | 7/2019 | Smith | G06F 3/065 |
| 2020/0169383 A1* | 5/2020 | Durham | H04L 9/0637 |
| 2021/0119780 A1* | 4/2021 | Hassan | H04L 9/088 |
| 2022/0100911 A1* | 3/2022 | Trikalinou | G06F 21/606 |
| 2022/0138329 A1* | 5/2022 | Kounavis | H04L 9/0861 713/190 |

(Continued)

FOREIGN PATENT DOCUMENTS

| | | | | |
|---|---|---|---|---|
| EP | 4156594 A1 * | 3/2023 | ......... | G06F 12/0238 |
| WO | WO-2018052577 A1 * | 3/2018 | ......... | G06F 12/1408 |

OTHER PUBLICATIONS

"IEEE Standard for Wide-Block Encryption for Shared Storage Media," in IEEE Std 1619.2-2021 (Revision of IEEE Std 1619.2-2010), vol., No., pp. 1-88, Jun. 16, 2021.*

(Continued)

*Primary Examiner* — Pierre Michel Bataille
(74) *Attorney, Agent, or Firm* — Crowell & Moring LLP

(57) ABSTRACT

A data storage device has a controller, a decryption engine, and a memory storing encrypted data. Instead of using the decryption engine to generate a tweak value needed to decrypt the encrypted data, the tweak value is generated by the controller while the controller is waiting for the encrypted data to be read from the memory. This hides the latency to compute the tweak value in the latency to read the encrypted data from the memory.

18 Claims, 17 Drawing Sheets

(56) References Cited

U.S. PATENT DOCUMENTS

| | | | |
|---|---|---|---|
| 2022/0343029 A1* | 10/2022 | Sultana | G06F 9/324 |
| 2023/0027329 A1* | 1/2023 | Durham | G06F 21/602 |
| 2024/0249000 A1* | 7/2024 | Srivastava | H04L 9/003 |

OTHER PUBLICATIONS

C. Luo, Y. Fei and A. A. Ding, "Side-channel power analysis of XTS-AES," Design, Automation & Test in Europe Conference & Exhibition (DATE), 2017, Lausanne, Switzerland, 2017, pp. 1330-1335.*

C. Meijer and B. van Gastel, "Self-Encrypting Deception: Weaknesses in the Encryption of Solid State Drives," 2019 IEEE Symposium on Security and Privacy (SP), San Francisco, CA, USA, 2019, pp. 72-87.*

L. Wilke, J. Wichelmann, M. Morbitzer and T. Eisenbarth, "SEVurity: No Security Without Integrity : Breaking Integrity-Free Memory Encryption with Minimal Assumptions," 2020 IEEE Symposium on Security and Privacy (SP), San Francisco, CA, USA, 2020, pp. 1483-1496.*

U.S. Appl. No. 17/552,143, filed Dec. 15, 2021, entitled "Programmable ECC for MRAM Mixed-Read Scheme."

"AES-XTS Block Cipher Mode is used in Kingston's Encrypted USB Flash Drives"; Kingston Technology blog page; downloaded from the Internet on Jul. 18, 2023 at *AES-XTS Block Cipher Mode is used in Kingston's best encrypted USB Flash Drives—Kingston Technology*; Kingston Technology Corporation; Dec. 2018; 6 pages.

\* cited by examiner

| Clock Freq | Clock Period | Total AES-XTS Decryption Cycles | | Total AES-XTS Decryption Latency | % of overall 25ns read latency budget of MRAM channel controller (MCC) |
| --- | --- | --- | --- | --- | --- |
| | | Tweak Generation Cycles | Data Decryption Cycles | | |
| 2Ghz | 0.5ns | 14-16 | 14-16 | 14ns -16ns | 56% - 64% |
| 1.6Ghz | 0.625ns | 14 | 14 | 17.5ns | 70% |
| 1Ghz | 1ns | 14 | 14 | 28ns | 112% |

FIG. 6

| Clock Freq | Clock Period | Total AES-XTS Decryption Cycles | | Total AES-XTS Decryption Latency | % of overall 25ns read latency budget of MRAM channel controller (MCC) |
|---|---|---|---|---|---|
| | | Tweak Generation Cycles (Hidden) | Data Decryption Cycles | | |
| 2Ghz | 0.5ns | 0 | 14-16 | 7ns -8ns | 28% - 32% |
| 1.6Ghz | 0.625ns | 0 | 14 | 8.75ns | 35% |
| 1Ghz | 1ns | 0 | 14 | 14ns | 56% |

FIG. 8

DATA STORAGE DEVICE AND METHOD FOR HIDING TWEAK GENERATION LATENCY

CROSS-REFERENCE TO RELATED APPLICATION

This application claims priority to U.S. provisional patent application No. 63/461,953, filed Apr. 26, 2023, which is hereby incorporated by reference.

BACKGROUND

A data storage device can have a security engine to perform encryption and decryption of data. An example of a cryptographic algorithm that can be used by the security engine is AES-XTS, which refers to Advanced Encryption Standard (AES) cryptography that uses an XOR Encrypt XOR (XEX) Tweakable Block Cipher with Ciphertext Stealing (XTS). In AES-XTS, two keys are used-one to perform AES block encryption and the another to encrypt a "tweak value."

BRIEF DESCRIPTION OF THE DRAWINGS

FIG. 6 is a chart comparing decryption latency and a total read latency budget.

FIG. 8 is a chart comparing decryption latency and a total read latency budget.

DETAILED DESCRIPTION

The following embodiments generally relate to a data storage device and method for hiding tweak generation latency. In one embodiment, a data storage device is provided comprising a memory; a decryption engine; and a controller coupled with the memory and the decryption engine, wherein the controller is configured to: receive a read request comprising an address; read encrypted data from the memory, wherein the encrypted data is read from a location in the memory associated with the address; while the encrypted data is being read from memory, generate a value needed to decrypt the encrypted data, wherein the value is generated at least in part from the address; and send the encrypted data and the generated value to the decryption engine to decrypt the data.

In another embodiment, a method is provided that is performed in a memory controller in a data storage device comprising a memory and an AES-XTS decryption engine. The method comprises generating a tweak value from a read address during a time that encrypted data is being read from a location in the memory associated with the read address; and sending the tweak value and the encrypted data to the AES-XTS decryption engine.

In another embodiment, a data storage device is provided comprising a memory and means for reducing latency in decrypting encrypted data read from the memory by hiding a latency to compute a value to decrypt the encrypted data in a latency to read the encrypted data from the memory.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1A:
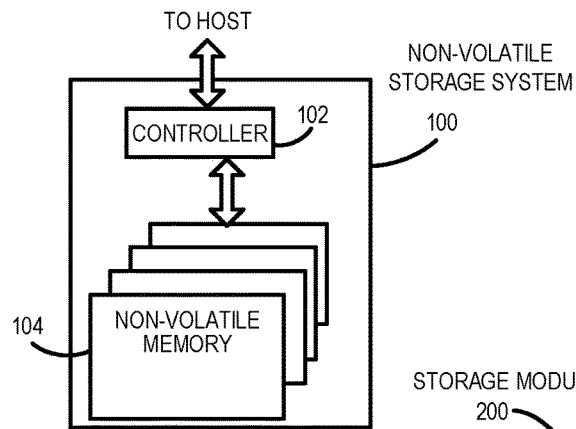
FIG. 1A is a block diagram of a data storage device of an embodiment.
Figure 1B:
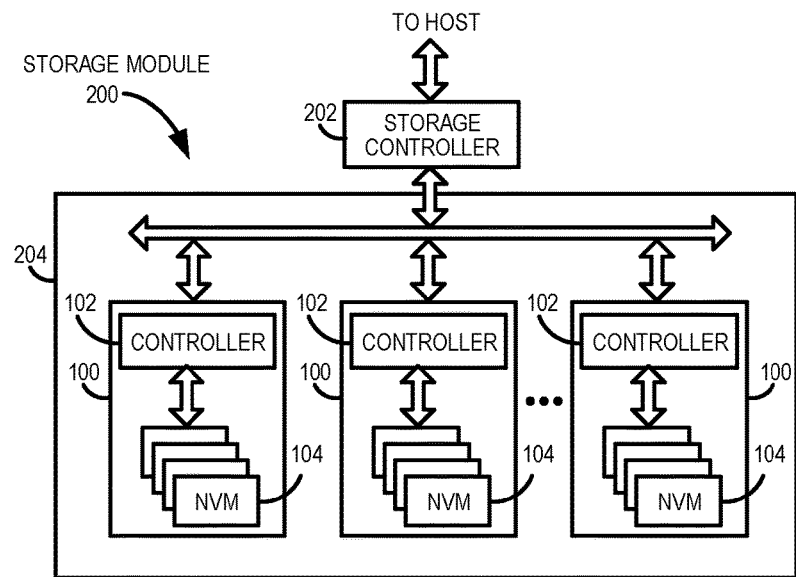
FIG. 1B is a block diagram illustrating a storage module of an embodiment.
Figure 1C:
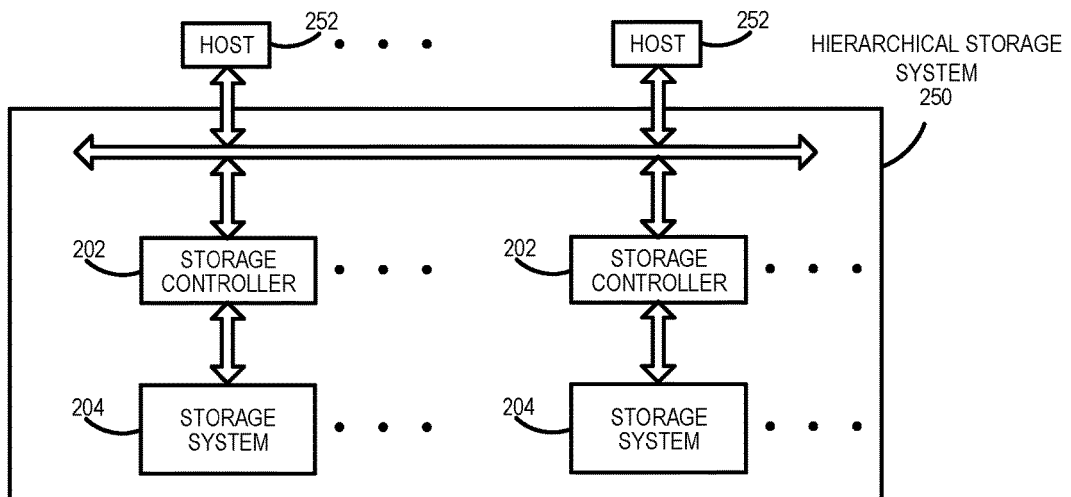
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C mayo be a rack mountable mass storage system that is accessible by multiple host computers, such as would be found in a data center or other location where mass storage is needed.

Figure 2A:
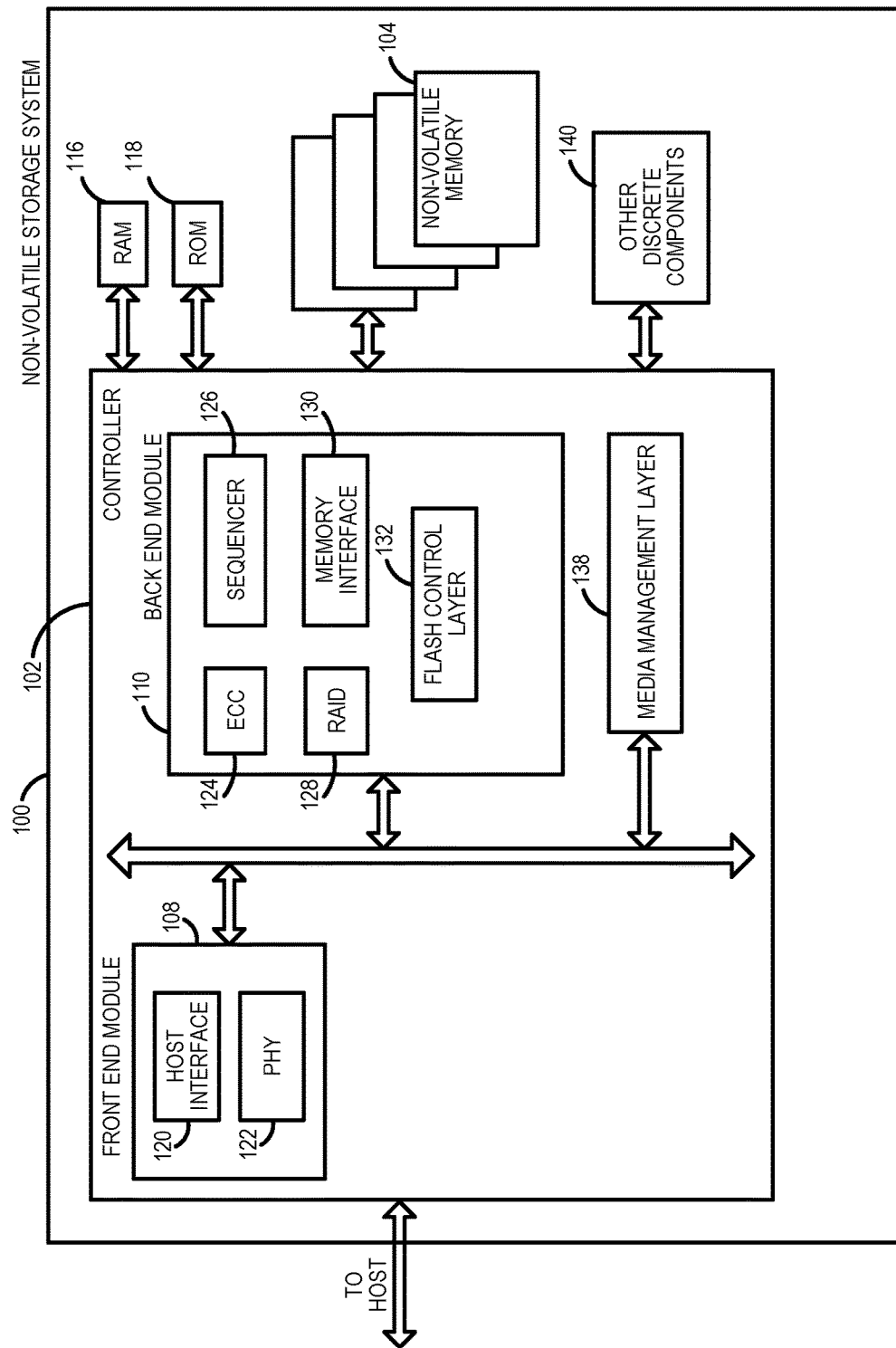
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
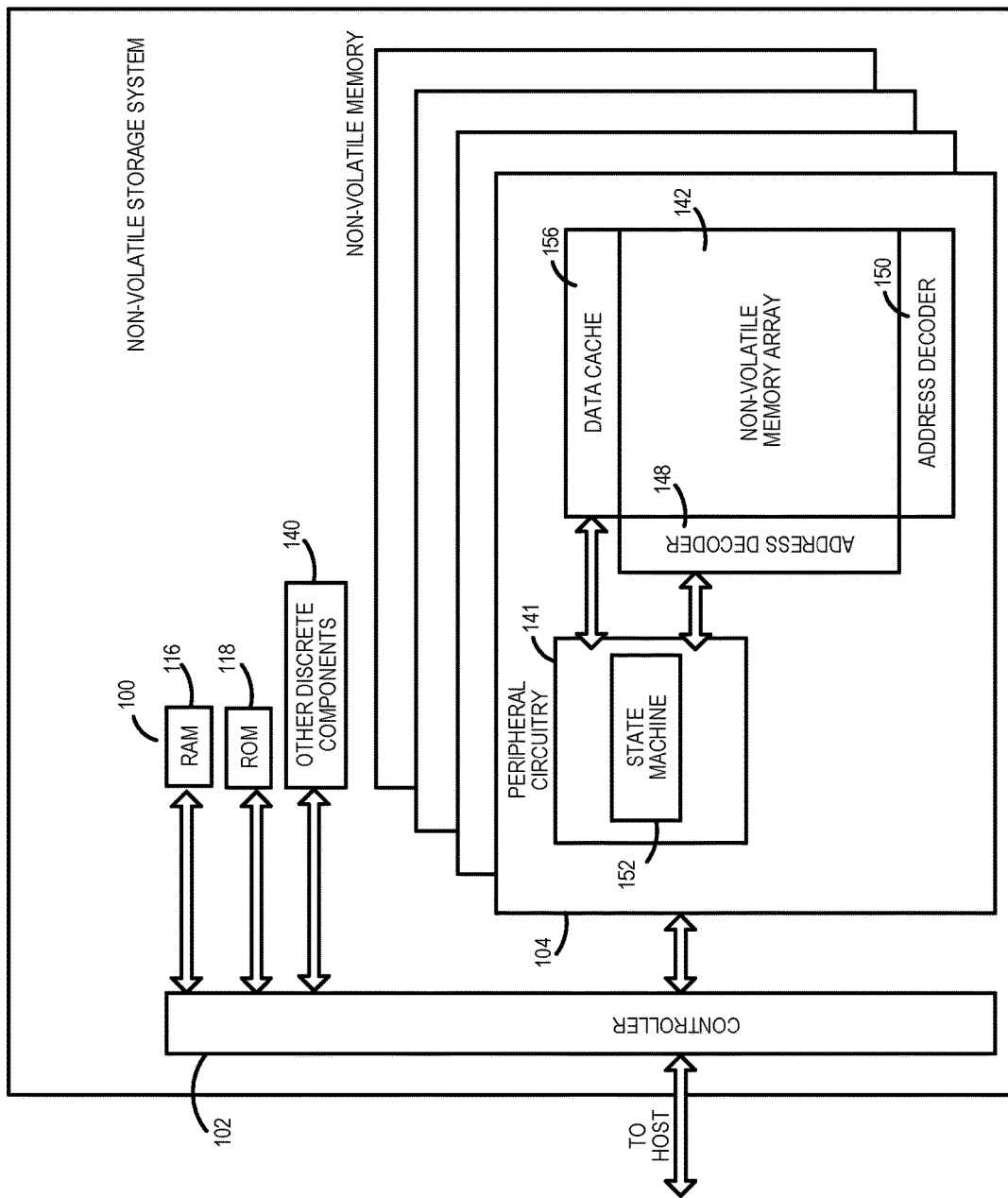
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
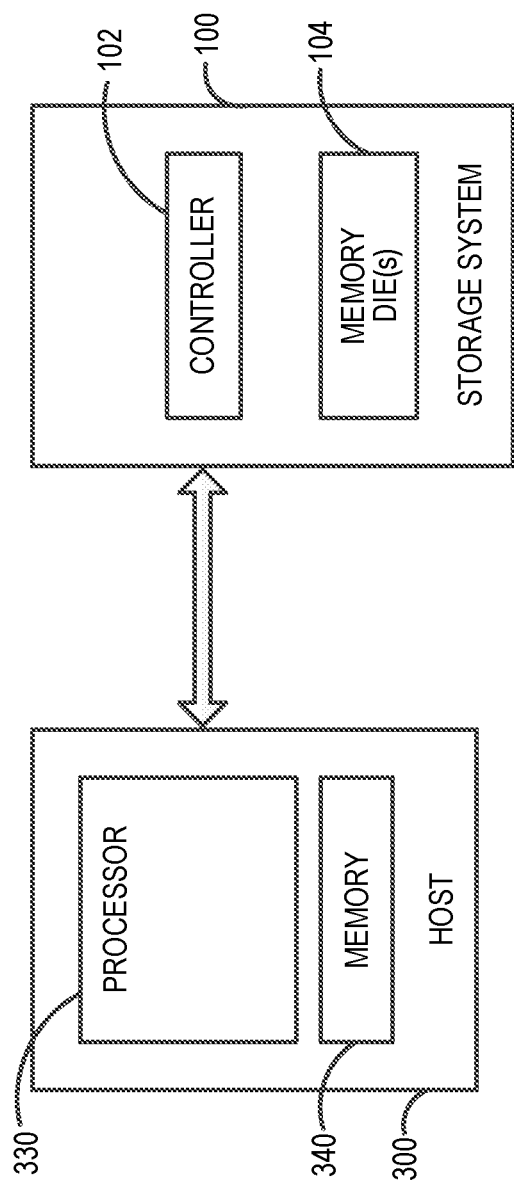
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In one embodiment, the data storage device 100 comprise a security engine that is separate from (but can be controlled by) the controller 102 and is configured to perform encryption and/or decryption of data stored in the memory 104 of the data storage device 100. The security engine will sometimes be referred to herein as a decryption engine, but it should be understood that the security engine may also perform encryption (alternatively, a separate encryption engine can be used). The security engine can be implemented in any suitable way. In one embodiment, the security engine comprises arithmetic logic units (ALUs) configured to perform cryptographic processing in accordance with one or more cryptographic algorithms. Any suitable cryptographic algorithm can be used.

In one embodiment, the security engine includes an ALU configured to perform encryption and decryption in accordance with the Advanced Encryption Standard (AES) established by the United States National Institute of Standards and Technology (NIST). The AES ALU can comprise control circuitry as well as an AES cryptography core. The AES core can be configured to cryptographically process blocks of data that are a set block size, such as 128 bits. To encrypt data larger than the set block size, AES can use a block cipher mode, such as XTS. XTS stands for "XEX Tweakable Block Cipher with Ciphertext Stealing," where XEX stands for "XOR Encrypt XOR." In general, AES is a block cipher, and XTS is a block cipher mode that uses two AES keys-one to perform AES block encryption and the another to encrypt a "tweak value," which can be used to update the encryption mechanism for each block of data encrypted within a sequence of blocks. Within the AES-XTS standard, the tweak value is a 128-bit element in a Galois Field (GF).

Figure 4:
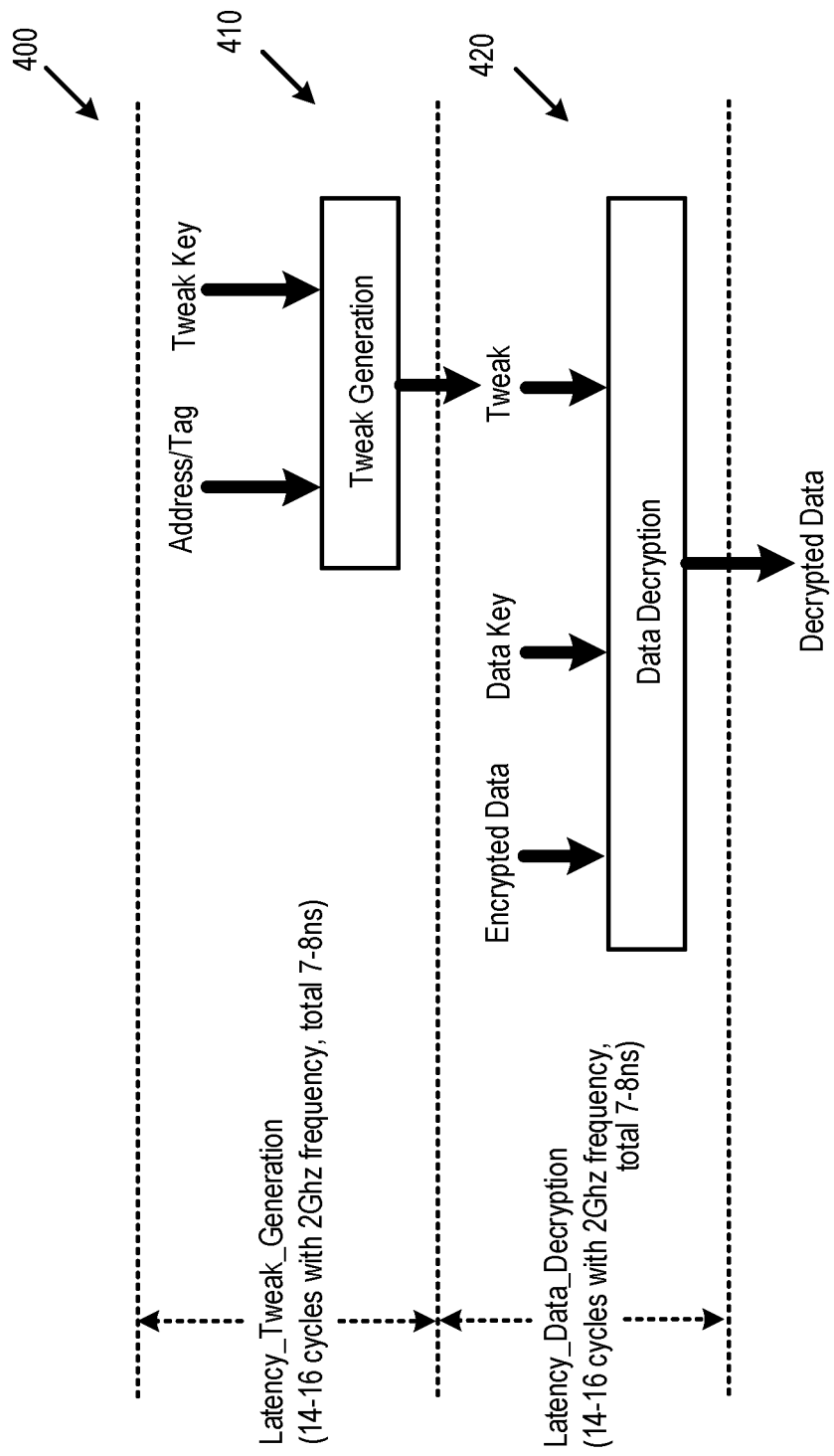
FIG. 4 is a flow chart of a method of an embodiment for decrypting data using an AES-XTS decryption algorithm.

Data encrypted using AES-XTS is effectively double-encrypted using two independent keys, and the security engine performs the reverse process to decrypt the data. For example, as shown in the flow diagram 400 in FIG. 4, the reverse process can comprise a tweak generation stage 410 and a data decryption stage 420. In the tweak generation stage 410, the tweak generator generates a tweak value from a tweak key and a logical block address and/or tag of the data retrieved from the memory 104. In the data decryption stage 420, the encrypted data, the data key for the data, and the tweak value are provided to a decryption engine, which outputs the decrypted data. These two stages need to be performed sequentially because the second stage need the tweak value, which is the outcome of the first stage. As indicated in FIG. 4, each of these stages 410, 420 is associated with the same latency (e.g., 14-16 cycles with 2 GHz frequency, totaling 7-8 ns). In addition to these latencies, there is a latency in reading the encrypted data from the memory 104 ("memory" is sometime referred to below as "media").

Figure 5:
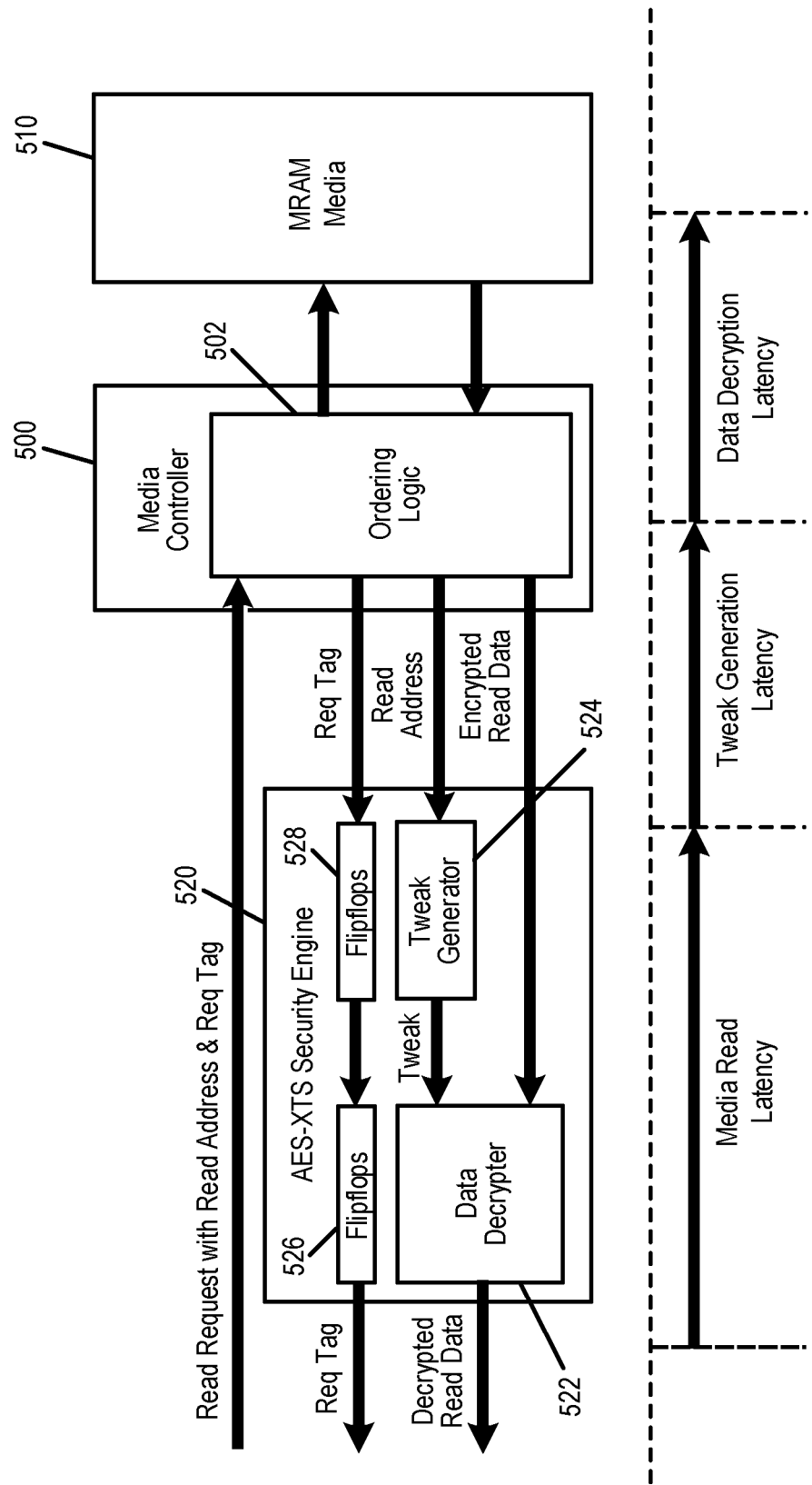
FIG. 5 is a block diagram of a data storage device of an embodiment.

FIG. 5 is a block diagram of some example components of a data storage device of an embodiment. As shown in FIG. 5, these components include a media controller 502 comprising ordering logic 502 and media/memory 510. In this example, the media 510 comprises MRAM, although any suitable type of memory can be used. As MRAM may be a relatively-less reliable form of memory (e.g., compared to NAND), it can benefit from the robustness offered by AES-XTS. FIG. 5 also shows that the media controller 500 is in communication with an AES-XTS security engine 520, which comprises a data decrypter 522, a tweak generator 524, and flipflops 526, 528. Additional/different components can be used. For example, the security engine 520 can also have a data encrypter (or a separate encryption engine can be used). Also, while the security engine 520 is configured to use AES-XTS in this embodiment, a different algorithm is used in other embodiments.

As shown in FIG. 5, the media controller 500 receives, from the host 300, a read request with a read address (e.g., the logical address or the corresponding physical address) and, optionally, a tag that identifies the process in the host 300 that is requesting the data. The ordering logic 502 in the media controller 500 determines the order of this request with respect to other received requests and, at the appropriate time, reads the encrypted data from the media 510. The media controller 500 then provides the tag, the read request, and the encrypted data to the security engine 520. The read request is used by the tweak generator 524 to generate the tweak value, which is provided as an input, along with the encrypted data, to the data decrypter 522, which decrypts and outputs decrypted data. In this example, the tag is simply passed through the security engine 520 (using flip flops 526, 528 to sync its delivery to the host with the decrypted data). In other examples, the tag is provided as an input to the tweak generator 524 in addition to or instead of the read address. As shown at the bottom of FIG. 5 and in the chart of FIG. 6, tweak computation and data decryption take same amount of time (in this example, 14-16 cycles with 2 Ghz frequency, totaling 7-8 ns) in hardware implementation and results in a relatively-high latency overhead.

The following embodiments can be used to reduce this latency overhead by effectively hiding the latency to compute the tweak value in the latency to read the encrypted data from the media 510. Given that AES-XTS decryption latency represents a large part of read round-trip latency within an MRAM Channel Controller (MCC), these embodiments can substantially reduce the read round-trip latency of a MCC. In one embodiment (see FIG. 7), the tweak generator 704 is moved from the security engine 720 to the media controller 700. In operation, the media controller 700 receives, from the host 300, a read request with a read address (e.g., LBA) and, optionally, a tag that identifies the process in the host 300 that is requesting the data. The ordering logic 702 in the media controller 700 determines the order of this request with respect to other received requests and, at the appropriate time, reads the encrypted data from the media 710. In this embodiment, the tweak generator 704 generates the tweak value during the latency associated with reading the encrypted data from the media 710. That way, the tweak value is already generated by the time the media controller 700 is ready to send the encrypted data to the security engine 720. This allows both the encrypted data and the tweak value to be sent to the security engine 720 at the same time, so the data decrypter 722 can begin decrypting the encrypted data upon receipt rather than having to wait for the tweak value to be generated. That is, preparing the tweak value during the sensing time from the media 510 hides the tweak generation in the read pipe. Hence, when the data is received from the media 510, the AES decryption process can start immediately without further delay.

Figure 7:
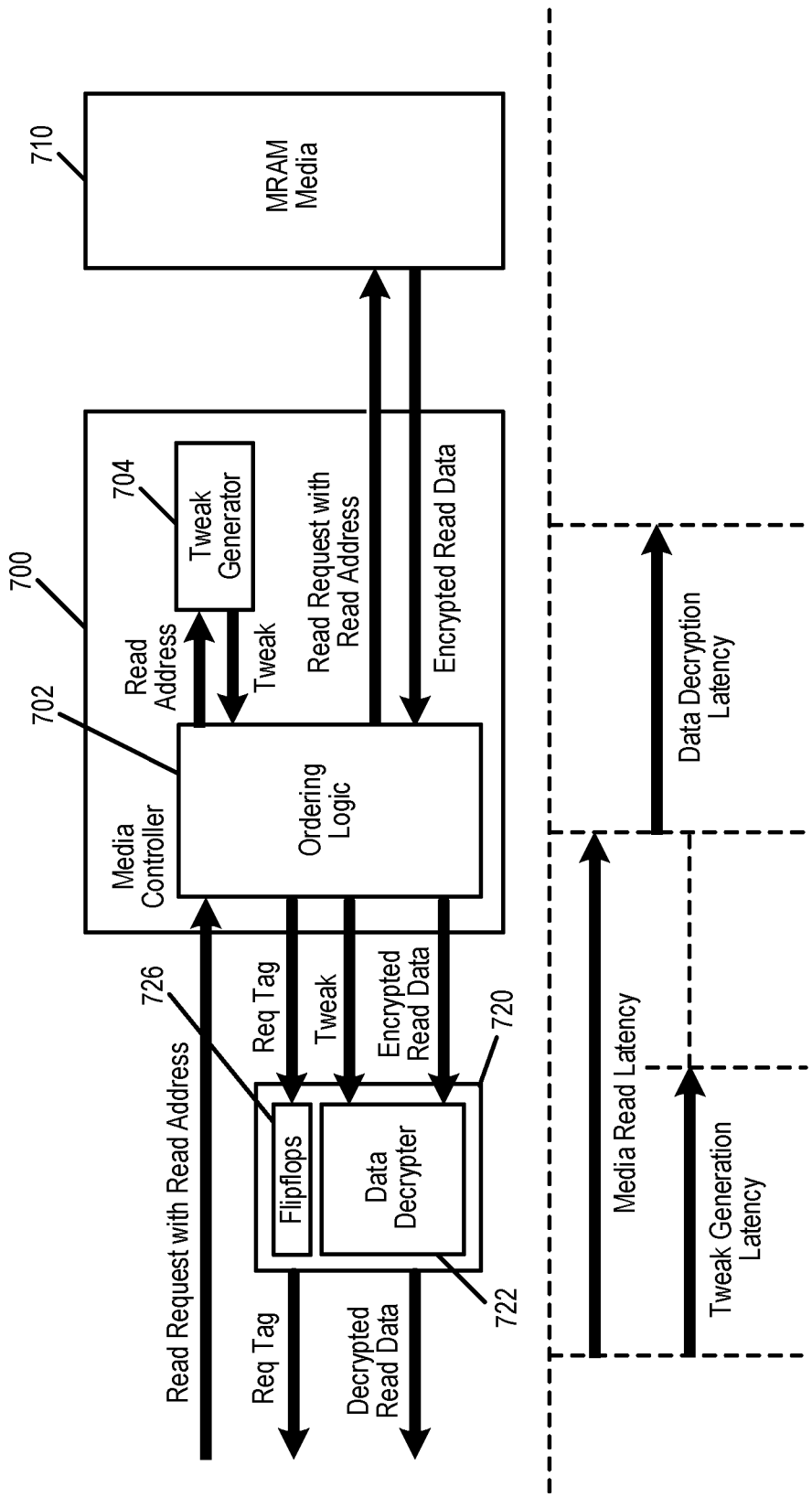
FIG. 7 is a block diagram of a data storage device of an embodiment.

As shown at the bottom of FIG. 7 and in the chart of FIG. 8, the media read latency, tweak generation latency, and data decryption latency are reduced as compared to the embodiment described above. Further, only a single set of flip flops 726 are used in this embodiment due to the reduction in latency. More specifically, moving the tweak generator to the media controller so tweak value generation can be done in parallel with the media read allows the tweak generation latency to be hidden within the media read latency. By doing so, the total AES-XTS decryption latency can be halved, resulting in an AES-XTS decryption latency taking 28-56% of the overall MCC budget, in one example.

A challenge can be presented when the media controller is "out-of-order" (i.e., the order of returned data is different from the order of the read requests). The following embodiments can be used to match the generated tweak value with the right read data. In some embodiments, a conventional memory protocol is used in which read data is returned in-order with the issuing requests. In another embodiment, a mixed read memory protocol is used in which read data is returned out-of-order with the issuing requests. These embodiments will be discussed below.

Figure 9:
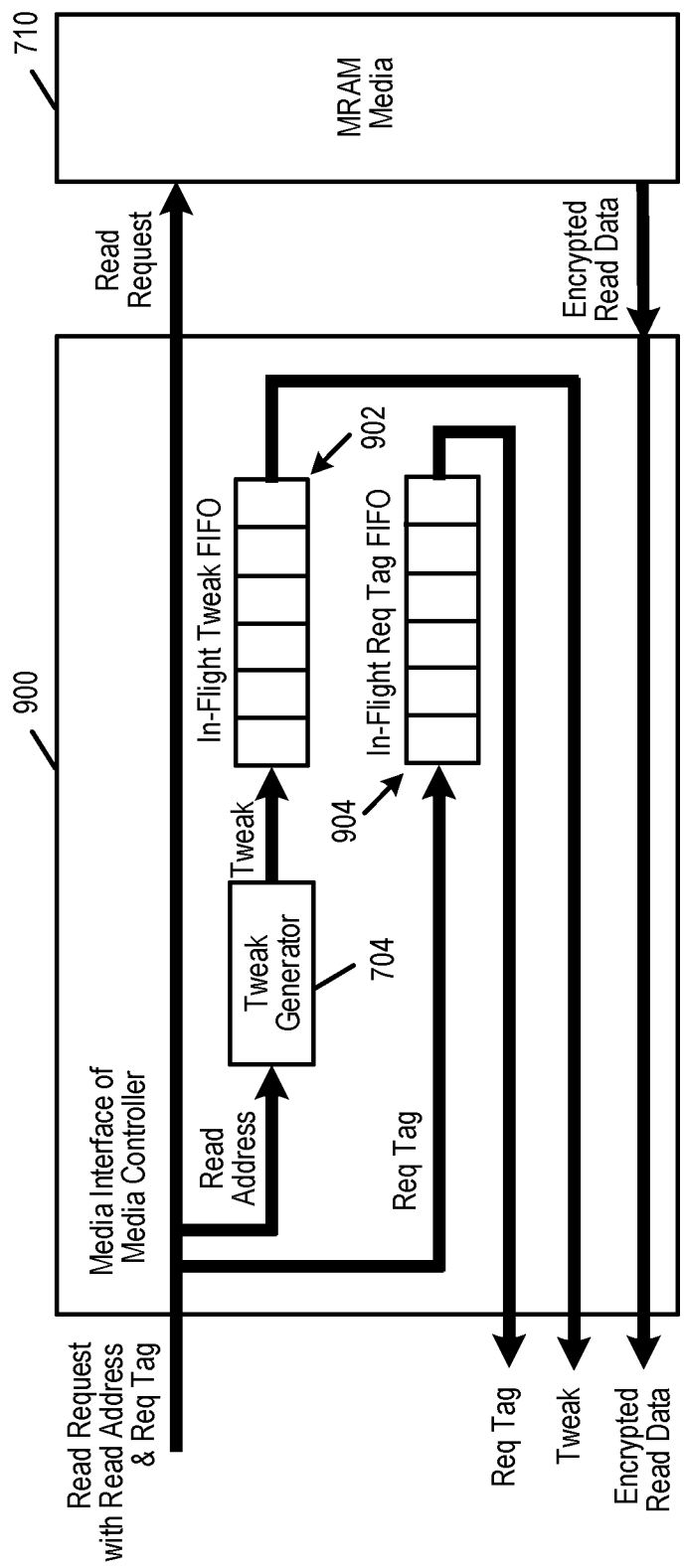
FIG. 9 is an illustration of a media interface of a media controller of an embodiment.

Turning again to the drawings, FIG. 9 shows an example media interface 900 that can be used in a media controller using a conventional memory protocol (e.g., DDR5), in which the media interface 900 returns the read data with the same order as the issuing order of the read request to media. As shown in FIG. 9, in this example, the media interface 900 can comprises the tweak generator 704 and two in-flight first-in-first-out (FIFO) buffers 902, 904—one for the tweak value and the other for the tag. The FIFOs 902, 904 can be configured to output the tweak value and tag when their corresponding encrypted data is read from the media 710, so all three can be delivered together. More specifically, when a read request gets issued, its read address is fed to tweak generator 704, and the generated tweak is then pushed into an in-flight tweak FIFO 902. When the encrypted read data is returned from the media 710, the media interface 900 dequeues the heads of both the in-flight req tag FIFO 904 and the in-flight tweak FIFO 902. As a result, the read encrypted data is returned with its corresponding read address and tweak.

Figure 10:
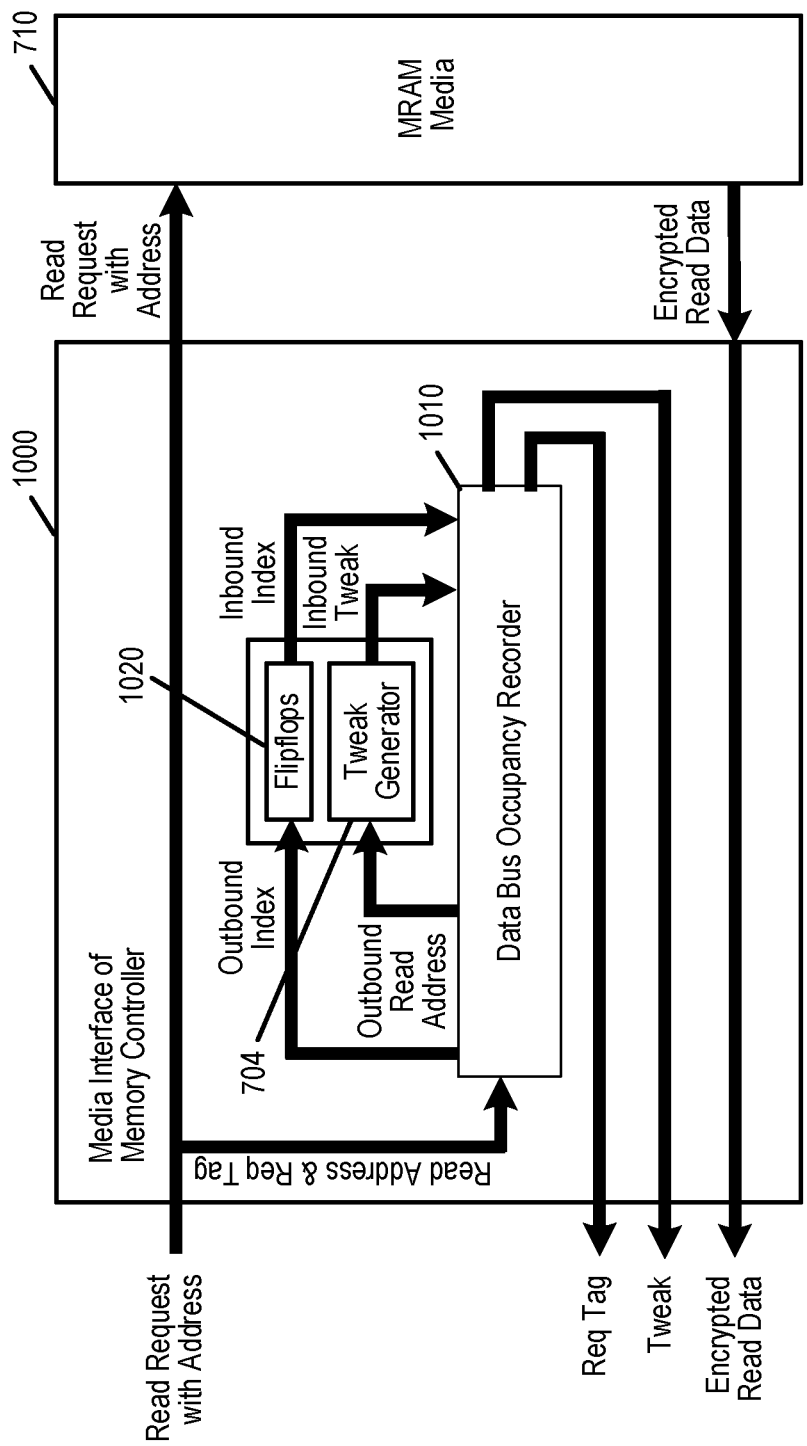
FIG. 10 is an illustration of a media interface of a media controller of an embodiment, where the media interface comprises first-in first-out buffers.
Figure 11:
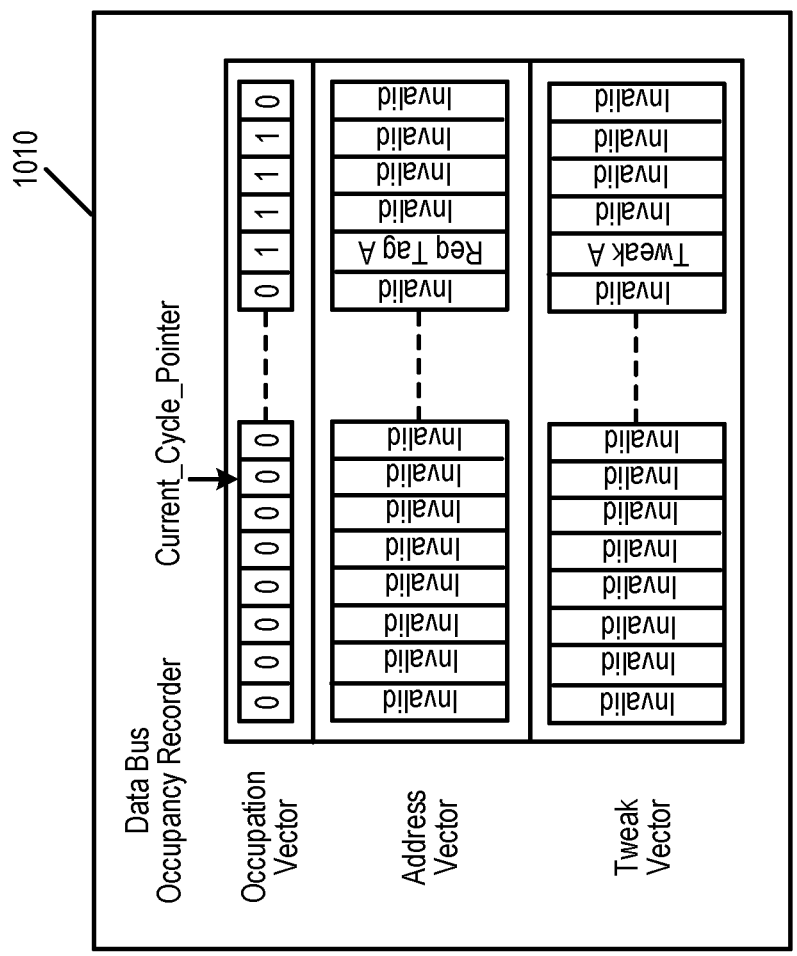
FIG. 11 is an illustration of a media interface of a media controller of an embodiment, where the media interface comprises a data bus occupancy recorder.

FIG. 10 shows another example media interface 1000 that can support mixed read. In this example, instead of contained FIFOs, the media interface 1000 comprises a data bus occupancy recorder 1010 and flip flops 1020. The data bus occupancy recorder 1010 can send the read address along with an index to the tweak generator 704, and the tweak generator 704 can return the generated tweak value along with the corresponding index. When the media 710 returns the read encrypted data, the data bus occupancy recorder 1010 can also return the corresponding tag and tweak value. FIG. 11 is an illustration of the contents of the data occupancy buffer 1010 in one example use case. As shown in FIG. 11, the data occupancy buffer 1010 in this example stores occupation vectors, address vectors, and tweak vectors, which are pointed to be a current cycle pointer.

Figure 12:
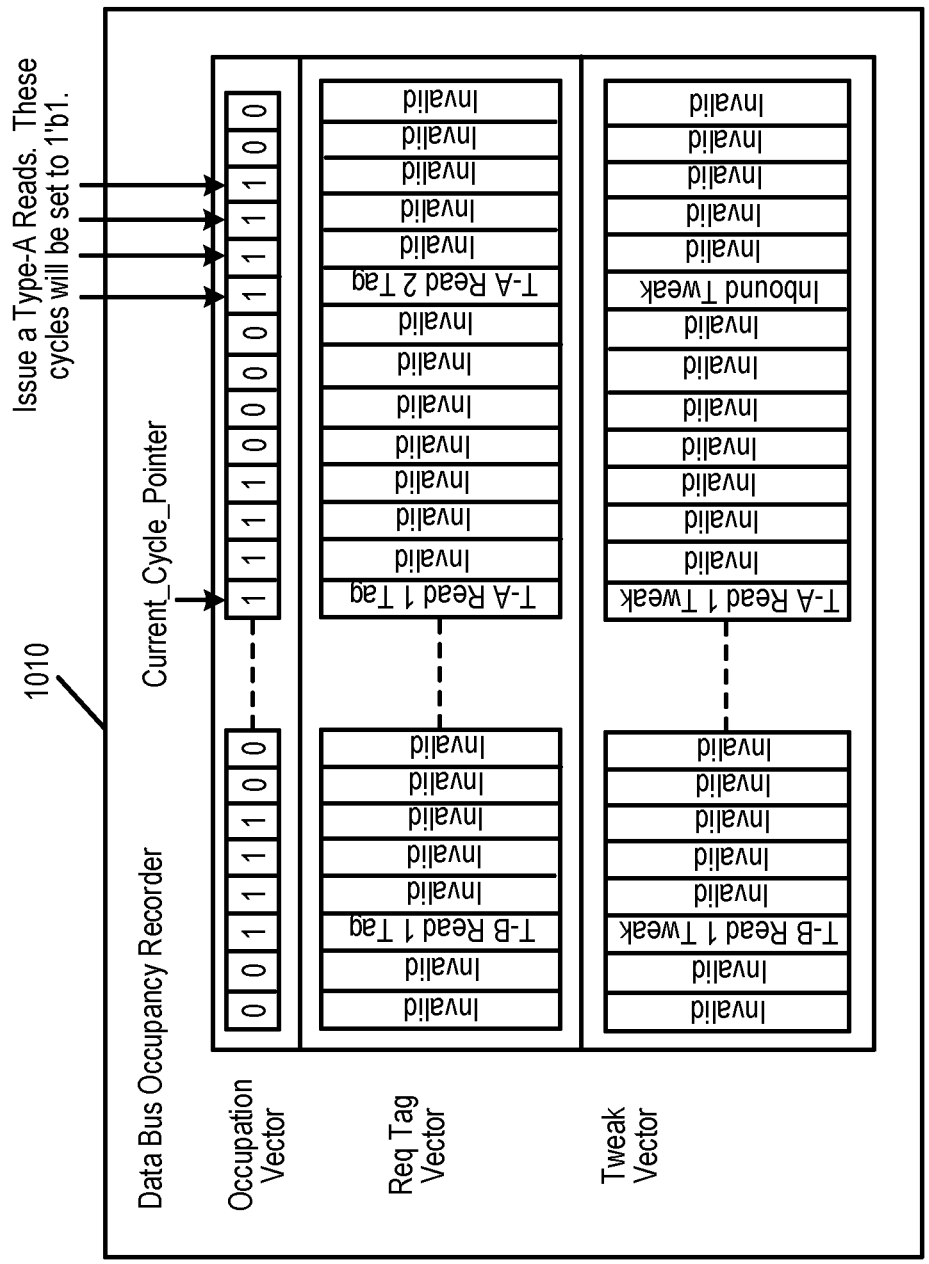
FIG. 12 is an illustration of a data bus occupancy recorder of an embodiment.
Figure 13:
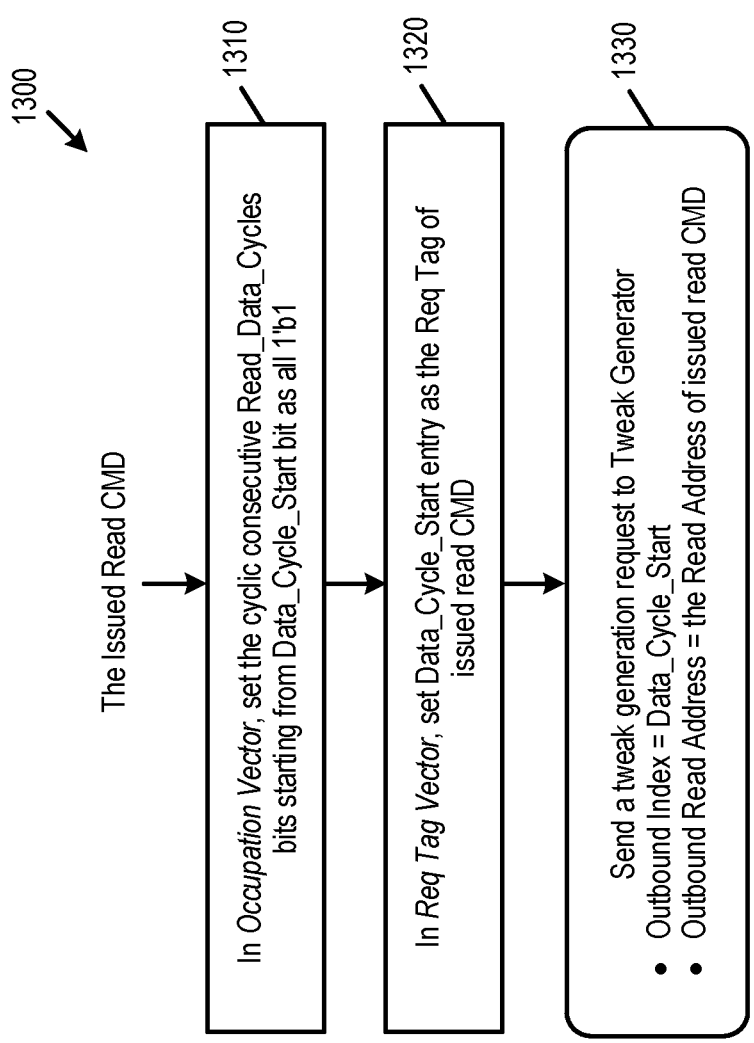
FIG. 13 is a flow chart of a method of an embodiment for issuing a tweak generation request when updating a data bus occupancy recorder on an issued read command.
Figure 14:
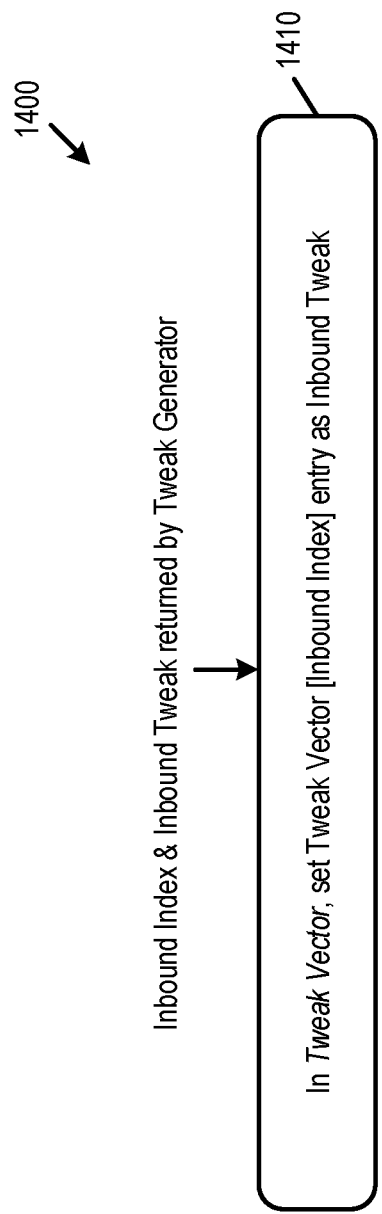
FIG. 14 is a flow chart of a method of an embodiment for setting a tweak vector when updating a data bus occupancy recorder on an issued read command.

FIG. 12 is an illustration of the contents of the data occupancy buffer 1010, which will be discussed in conjunction with the flow charts 1300, 1400 in FIGS. 13 and 14. The flow chart in FIG. 13 is for a method of an embodiment for issuing a tweak generation request when updating a data bus occupancy recorder on an issued read command. As shown in FIG. 13, this method comprises setting the cyclic consecutive read bits in the occupation vector (act 1310), setting an entry in the request tag vector (act 1320), and sending a tweak generation request to the tweak generator (act 1330). So, in this step, when a read request is issued, after handling the occupation vector and reg tag vector update, the data bus occupancy recorder 1010 sends a tweak generation request to the tweak generator 704 with Data_Cycle_Start as the outbound index and the read address of issued read command as the outbound read address. The flow chart 1400 in FIG. 14 is for a method of an embodiment for setting a tweak vector when updating a data bus occupancy recorder on an issued read command. As shown in FIG. 14, this method comprises setting a tweak vector entry in the tweak vector (act 1410). So, when the tweak generator 704 returns the inbound tweak with the inbound index, the tweak vector/ inbound index entry is set as an inbound tweak.

Figure 15:
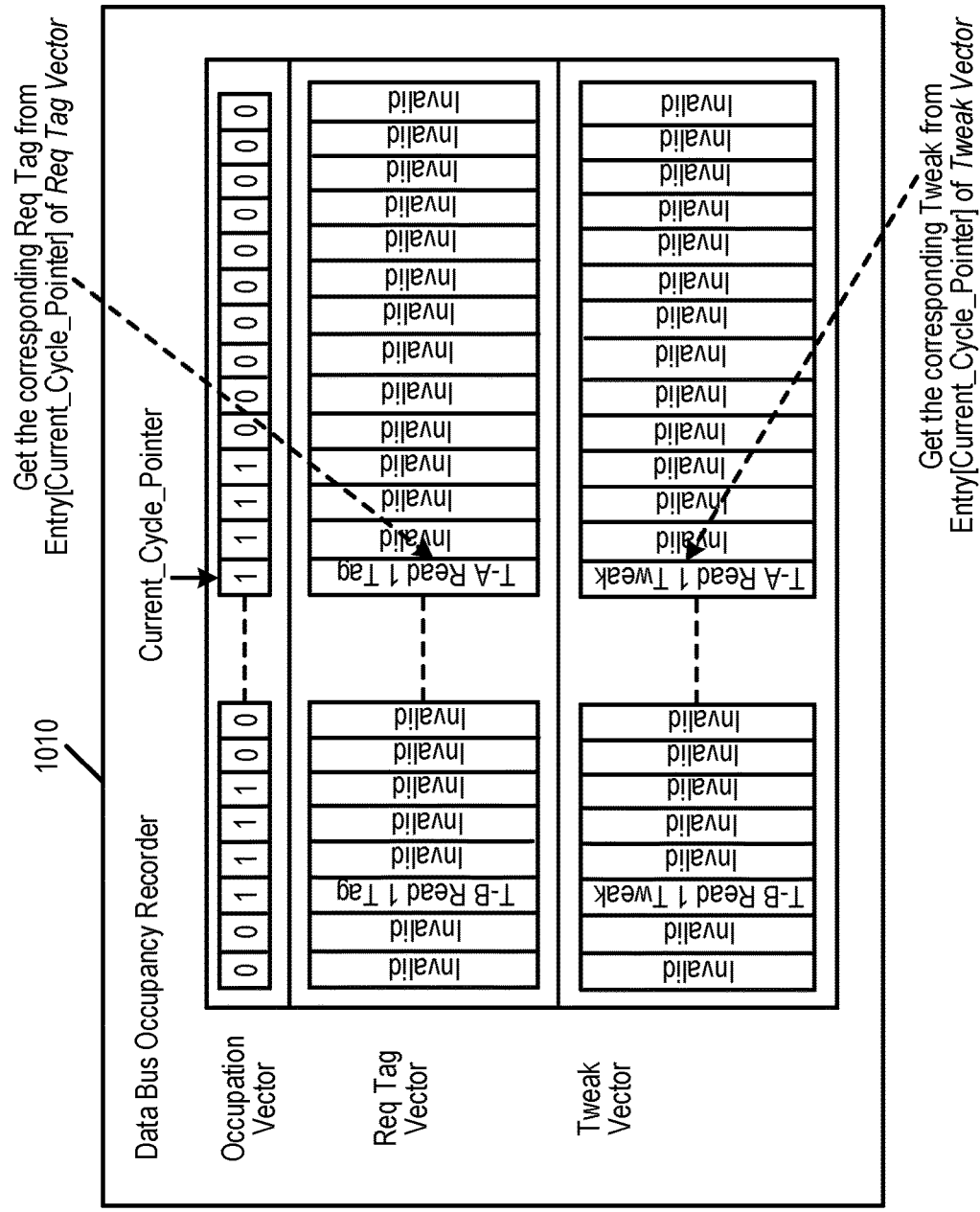
FIG. 15 is an illustration of a data occupancy recorder of an embodiment.
Figure 16:
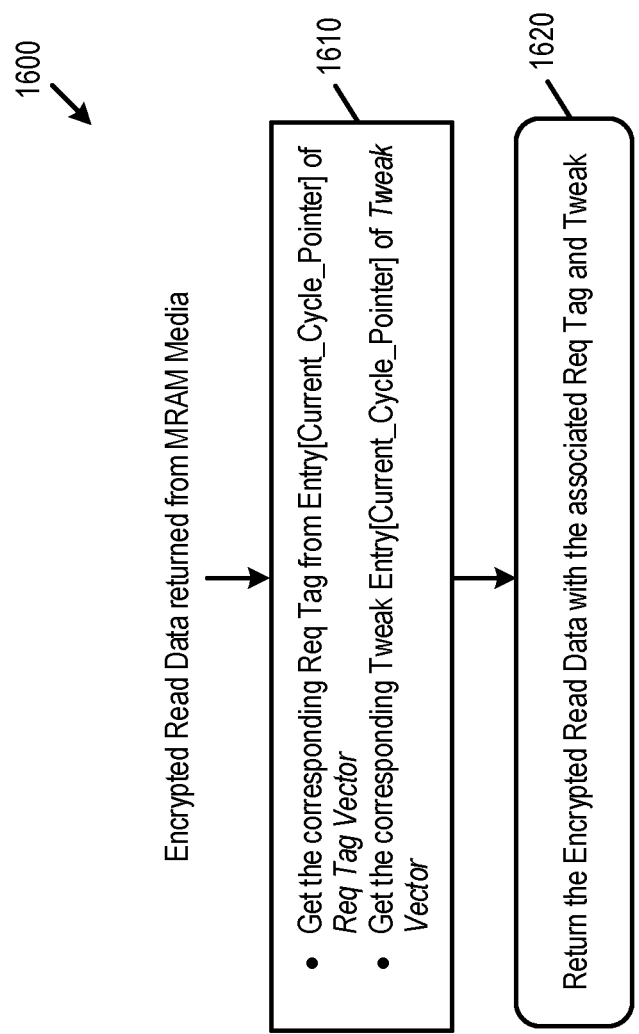
FIG. 16 is a flow chart of a method of an embodiment for returning encrypted data read from a memory.

FIG. 15 is an illustration of the contents of the data occupancy buffer 1010 in another example use case related to read data handling and will be discussed in conjunction with the flow chart 1600 in FIG. 16, which is for a method for returning encrypted data read from a memory. As shown in FIG. 16, this method comprises getting a corresponding tag from a request tag vector and a corresponding tweak vector entry in the tweak vector (act 1610) and returning encrypted read data (act 1620). So, in this method, when read encrypted data is returned from the media, instead of just looking up the corresponding req tag, the media controller also looks up the tweak value in the tweak vector.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. In a data storage device comprising a memory and an AES-XTS decryption engine, a method comprising:
   receiving a read request comprising a read address;
   reading encrypted data from the memory, wherein the encrypted data is read from a location in the memory associated with the read address;
   while the encrypted data is being read from the memory:
      generating a tweak value from the read address during latency associated with reading encrypted data from the memory; and
      storing the tweak value in a buffer in the data storage device;
   receiving the encrypted data read from the memory, wherein the encrypted data is received out-of-order with respect to read requests processed by the memory; and
   after receiving the encrypted data from the memory:
      identifying a location of the tweak value in the buffer using a current cycle pointer; and
      sending the tweak value and the encrypted data to the AES-XTS decryption engine, wherein the encrypted data is decryptable by the AES-XTS decryption engine without the AES-XTS decryption engine having to wait for the tweak value to be generated.

2. The method of claim 1, further comprising:
   receiving a tag associated with a process in a host that requested the encrypted data; and
   sending the tag along with the encrypted data and the tweak value to the AES-XTS decryption engine.

3. The method of claim 1, wherein the data storage device comprises a data bus occupancy recorder.

4. The method of claim 3, further comprising issuing a tweak generation request when updating the data bus occupancy recorder on an issued read command.

5. The method of claim 3, further comprising setting a tweak vector when updating the data bus occupancy recorder on an issued read command.

6. The method of claim 1, wherein the memory comprises magnetoresistive random-access memory (MRAM).

7. The method of claim 1, wherein the memory comprises a three-dimensional memory.

8. A data storage device comprising:
   a memory;
   a decryption engine; and
   a processor coupled with the memory and the decryption engine, wherein the processor is configured to:
      receive a read request comprising an address;
      read encrypted data from the memory, wherein the encrypted data is read from a location in the memory associated with the address;
      while the encrypted data is being read from the memory:
         generate a value needed to decrypt the encrypted data, wherein the value is generated at least in part from the address during latency associated with reading the encrypted data from the memory; and
         store the value in a first-in-first-out buffer in the data storage device;
      receive the encrypted data read from the memory, wherein the encrypted data is received in-order with respect to read requests processed by the memory; and
      after receiving the encrypted data from the memory:
         dequeue the value from a head of the first-in-first-out buffer; and
         send the encrypted data and the value to the decryption engine, wherein the encrypted data is decryptable by the decryption engine without the decryption engine having to wait for the value to be generated.

9. The data storage device of claim 8, wherein the processor is further configured to:
   receive a tag associated with a process in a host that requested the encrypted data; and
   send the tag along with the encrypted data and the value to the decryption engine.

10. The data storage device of claim 8, wherein the decryption engine is configured to use two keys to decrypt the encrypted data, and wherein one of the two keys comprises the value.

11. The data storage device of claim 8, wherein the value comprises a tweak value.

12. The data storage device of claim 8, wherein the decryption engine is configured to decrypt the encrypted data using an AES-XTS algorithm.

13. The data storage device of claim 8, wherein the processor comprises a data bus occupancy recorder.

14. The data storage device of claim 13, wherein the processor is further configured to issue a tweak generation request when updating the data bus occupancy recorder on an issued read command.

15. The data storage device of claim 13, wherein the processor is further configured to set a tweak vector when updating the data bus occupancy recorder on an issued read command.

16. The data storage device of claim 8, wherein the memory comprises magnetoresistive random-access memory (MRAM).

17. The data storage device of claim 8, wherein the memory comprises a three-dimensional memory.

18. A data storage device comprising:
   a memory;
   a decryption engine; and
   means for:
      receiving a read request comprising an address;
      reading encrypted data from the memory, wherein the encrypted data is read from a location in the memory associated with the address;
      while the encrypted data is being read from the memory;
         generating a value needed to decrypt the encrypted data, wherein the value is generated at least in part from the address during latency associated with reading the encrypted data from the memory; and
         storing the value in a buffer in the data storage device;
      receiving the encrypted data read from the memory; and
      after receiving the encrypted data from the memory:
         sending the encrypted data and the value to the decryption engine, wherein the encrypted data is decryptable by the decryption engine without the decryption engine having to wait for the value to be generated;
         wherein the value is either dequeued from a head of the buffer or located in the buffer using a current cycle pointer depending on whether the encrypted data is received in-order or out-of-order, respectively, with respect to read requests processed by the memory.

* * * * *